(No Model.)  2 Sheets—Sheet 1.
E. J. LEWIS.
MACHINE FOR PARING FRUIT OR VEGETABLES.
No. 508,729.  Patented Nov. 14, 1893.
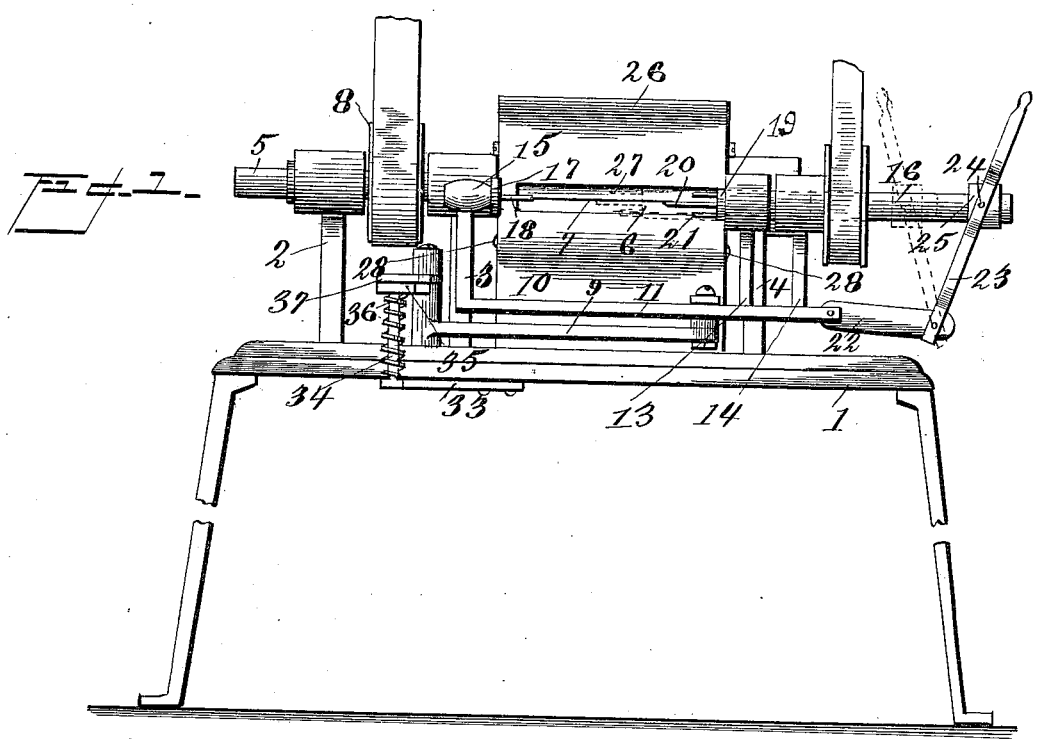
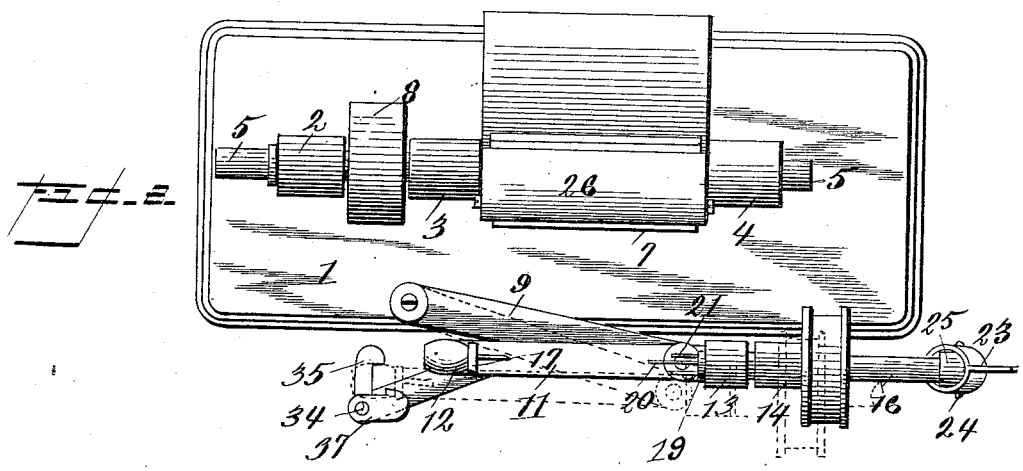
Witnesses  Inventor
E. J. Lewis
By J. R. Nottingham
Attorney (No Model.) 2 Sheets—Sheet 2.
E. J. LEWIS.
MACHINE FOR PARING FRUIT OR VEGETABLES.
No. 508,729. Patented Nov. 14, 1893.
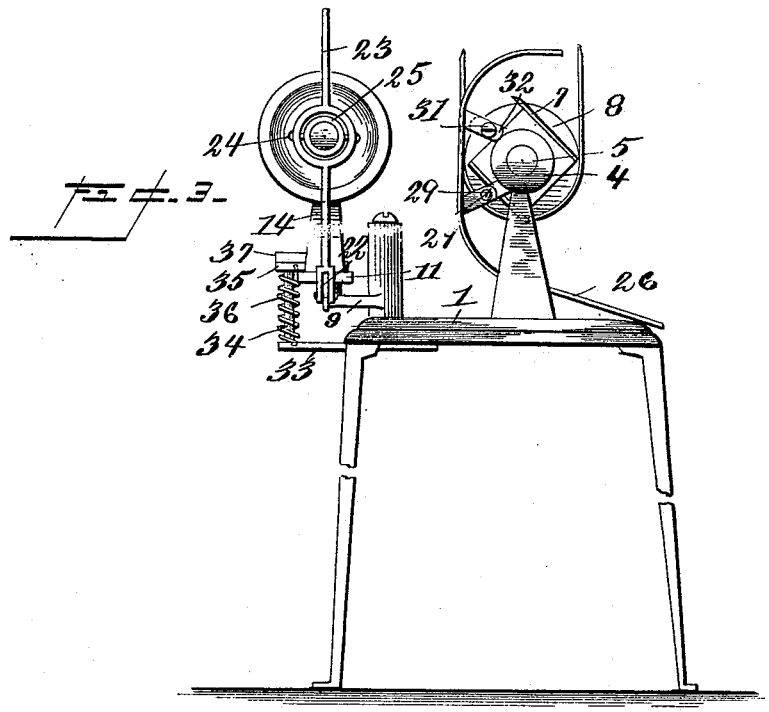
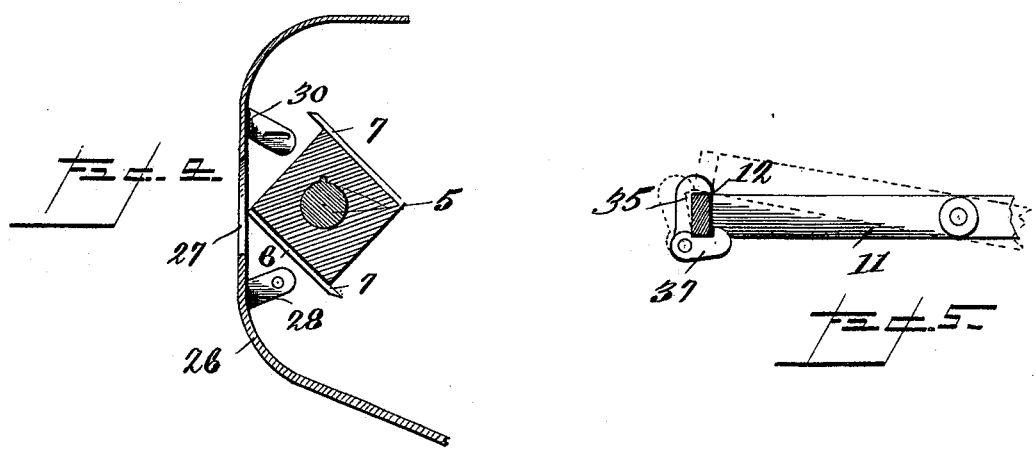
Witnesses
O. W. Johnson.
E. R. Hills.
Inventor
E. J. Lewis
By J. R. Nottingham
Attorney

UNITED STATES PATENT OFFICE.

ELGIE J. LEWIS, OF MIDDLEPORT, NEW YORK.

MACHINE FOR PARING FRUIT OR VEGETABLES.

SPECIFICATION forming part of Letters Patent No. 508,729, dated November 14, 1893.

Application filed July 3, 1893. Serial No. 479,513. (No model.)

*To all whom it may concern:*

Be it known that I, ELGIE J. LEWIS, a citizen of the United States, residing at Middleport, in the county of Niagara and State of New York, have invented certain new and useful Improvements in Machines for Paring Fruit or Vegetables; and I do hereby declare the following to be a full, clear, and exact description of the invention, such as will enable others skilled in the art to which it appertains to make and use the same.

My invention relates generally to improvements in machines for paring fruit and vegetables, but is more particularly designed to pare pineapples; and it has for its objects, first, to provide a fruit or vegetable holder by means of which the article to be pared can be presented in various positions to a revolving cutter; second, to provide proper means for adjusting the depth of cut, so as to adapt the machine to different qualities of fruits or vegetables, and, third, to arrange for the confining of the holder during the operation of applying and removing the fruit or vegetable.

The invention consists essentially in a new and novel arrangement of the fruit or vegetable holder in combination with a cutter or cutter-knives, as hereinafter described and claimed.

In the accompanying drawings:—Figure 1, illustrates a side elevation of my improved machine; Fig. 2, a top plan view of the same; Fig. 3, an end view; Fig. 4, a transverse section of the cutter and the adjustable knife guard, and Fig. 5, a detached view of a portion of the confining devices, showing a top-plan view of the clutches in engagement with the standard of the holder.

Similar reference numerals indicate like parts throughout the several views, in which—

The numeral 1 indicates a bed upon which the various parts of the machine are supported, the said bed being supported upon suitable legs, as shown.

The numerals 2, 3, and 4 designate three vertical standards securely fastened to the bed and provided at their upper ends with bearing boxes in which is journaled a shaft 5. Mounted upon said shaft and securely keyed thereto, is a cutter, 6, which consists of a block of suitable material carrying cutting-knives 7 on two opposite sides, with their cutting edges projecting in opposite directions. The said shaft is also provided with a pulley, 8, by which it is driven by a suitable band. To the bed, in front of the standards, is pivoted a horizontal arm, 9, which has pivoted to its free end a fruit or vegetable holder, 10, consisting of a horizontal arm, 11, carrying three vertical standards 12, 13, and 14, which are provided with bearings for the shafts 15 and 16, shaft 15 being journaled in standard 12 and shaft 16 in standards 13 and 14. These shafts are somewhat similar to the centers of a lathe, and, like said centers, are directly in line with each other. The right hand shaft carries a band-pulley and is adapted to move longitudinally as well as to rotate in its bearings, while the left hand shaft simply rotates, and is provided with a face-plate 17 from which projects centrally a pin 18. The right hand shaft is provided with a similar face-plate 19 having a central pin, 20, and prongs 21 at each side thereof to hold the article to be pared. To the right of the arm is pivoted a link, 22, to which is fulcrumed one end of a lever, 23, which is pivoted at 24 to a collar, 25, loosely mounted upon the shaft 16 so as to permit said shaft to freely turn, but not move longitudinally in it.

The numeral 26 indicates the knife guard, which consists of a sheet of metal bent as shown in Figs. 3 and 4, and having an opening 27, in front through which the knives or blades of the cutter work, as the cutter is revolved. The said guard is hinged at 28 to lugs or brackets 29 secured to the standards 3 and 4, and is provided at its upper part with side lugs 30, slotted to receive set-screws 31, which are secured to lugs or brackets 32. By loosening the set-screws the guard can be moved inward or outward to regulate the depth of the cut. Besides regulating the depth of the cut, the guard also serves as a shield to the cutter, and a conveyer for the parings discharging them to the rear of the machine.

In order to apply the fruit or vegetable to the holder or remove it therefrom, without danger to the operative, I provide a confining-device consisting of a horizontal arm 33, secured to the under side of the bed and projecting therefrom; said arm having secured to its forward end a vertical standard 34, which has pivoted near its upper end a pawl, 35, having a catch at its end. A spiral spring, 36, having one end secured to the horizontal arm and the other end to said pawl, presses normally the pivoted pawl toward a similar stationary pawl 37 on the top of the standard. These pawls constitute a clutch, which engages the standard 12, as shown in Fig. 5, and securely confines the holder at a point of safety from the cutter.

The operation of my invention will be readily understood in connection with the description and drawings. The holder is swung outward until the standard 12 is engaged by the clutch. The article to be pared is then placed between the centers and fastened between the face-plates. The standard is released from the clutch, and the arms are then free to be manipulated to press different portions of the surface of the article forward to the cutter in succession, the fruit being revolved for the same purpose. During the paring operation, the cutter is revolved about two thousand revolutions per minute while the article being pared revolves only about forty revolutions per minute.

Heretofore great difficulty has been experienced in paring pineapples, owing to their hard and knotty exterior, and my invention is especially designed to overcome this difficulty. This I successfully do by employing and operating at a high rate of speed a rotary cutter in conjunction with the peculiarly constructed and arranged holder which permits the fruit to be pressed in any position to the cutter, so that every part of the rind may be removed, the cuts being smooth and clean and not jagged as heretofore.

Having thus fully described my invention, what I claim, and desire to secure by Letters Patent, is—

1. In a fruit or vegetable paring machine, the combination, with a rotary cutter, of a holder pivoted on a swinging arm, said holder comprising a horizontal arm and vertical standards carrying rotating centers, substantially as specified.

2. In a fruit or vegetable paring machine, the combination, with a rotary cutter, of the arm pivoted to the table, and the arm pivoted to the end of the first mentioned arm, the latter arm having vertical standards carrying rotating centers, and devices for securing the fruit, substantially as specified.

3. In a fruit or vegetable paring machine, the combination, with a rotary cutter, of a holder pivoted on a swinging arm and carrying revoluble centers, and means for reciprocating one of said centers, substantially as specified.

4. In a fruit or vegetable paring machine, the combination, with a rotary cutter, and a holder pivoted on a swinging arm, of a clutch for confining said holder during the operation of applying and removing the article to be pared, substantially as specified.

5. In a fruit or vegetable paring machine, the combination, with a rotary cutter and a holder pivoted on a swinging arm, of a spring-actuated clutch for confining said holder, as and for the purpose set forth.

6. In a fruit or vegetable parer, the combination, with a rotary cutter and an adjustable guard arranged in front of said cutter, of a holder pivoted on a swinging arm and carrying revoluble centers, means for reciprocating one of said centers, and a clutch for confining said holder, substantially as specified.

7. In a fruit or vegetable parer, the combination, with a rotary cutter of a holder pivoted on a swinging arm and carrying revoluble centers, a lever pivoted to said holder and fulcrumed to a collar on the shaft of one of said revoluble centers, by means of which said center is longitudinally reciprocated, and a spring-actuated clutch for confining the holder, as and for the purpose specified.

In testimony whereof I affix my signature in the presence of two witnesses.

ELGIE J. LEWIS.

Witnesses:
JOHN T. HUNT,
GEORGE F. THOMPSON.